US007904633B2

(12) United States Patent
Abraham et al.

(10) Patent No.: US 7,904,633 B2
(45) Date of Patent: Mar. 8, 2011

(54) SWITCH PROVIDING EXTERNAL ACCESS TO COMPUTER-SYSTEM COMPONENTS AND COMPUTER-SYSTEM PERIPHERALS

(75) Inventors: Benjamin Abraham, Cupertino, CA (US); Robert Campesi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 12/290,189

(22) Filed: Oct. 28, 2008

(65) Prior Publication Data

US 2010/0106884 A1    Apr. 29, 2010

(51) Int. Cl.
*G06F 13/00*    (2006.01)
(52) U.S. Cl. .......................... 710/316; 710/311; 710/306
(58) Field of Classification Search .......... 710/306–317, 710/62–64, 72
See application file for complete search history.

(56) References Cited

U.S. PATENT DOCUMENTS

| | | | | |
|---|---|---|---|---|
| 7,028,110 | B2 * | 4/2006 | Seki et al. | 710/36 |
| 7,340,556 | B2 * | 3/2008 | Lou et al. | 710/316 |
| 7,363,415 | B2 * | 4/2008 | Chu | 710/313 |
| 7,472,217 | B2 * | 12/2008 | Lou et al. | 710/316 |
| 7,496,697 | B2 * | 2/2009 | Sween et al. | 710/38 |
| 7,607,921 | B2 * | 10/2009 | Kong | 439/55 |
| 2003/0135654 | A1 * | 7/2003 | Chang | 709/250 |
| 2005/0044266 | A1 * | 2/2005 | O'Neil | 709/238 |
| 2006/0104289 | A1 * | 5/2006 | Lee | 370/400 |
| 2009/0189863 | A1 * | 7/2009 | Liu | 345/168 |
| 2009/0204742 | A1 * | 8/2009 | Wiler | 710/316 |

* cited by examiner

*Primary Examiner* — Raymond N Phan (57) ABSTRACT

Embodiments of the present invention include a switch component, incorporated within a computer system, that receives switch commands from users and that controls internal switches to direct output to, and receive input from, either components of the computer system or one or more external-access ports. The switch component allows one or more external computers to access internal components of, or external peripherals attached to, a computer system that includes the switch component.

20 Claims, 11 Drawing Sheets

SWITCH PROVIDING EXTERNAL ACCESS TO COMPUTER-SYSTEM COMPONENTS AND COMPUTER-SYSTEM PERIPHERALS

TECHNICAL FIELD

The present invention is related to computer systems and, in particular, to a computer system that includes a switch component to direct output to, and receive input from, either components of the computer system or one or more external-access ports.

BACKGROUND OF THE INVENTION

Until the 1980's, even small computer systems intended for personal use were relatively bulky systems that consumed relatively large portions of desktops and other workspace areas. At the time, compared with large minicomputers and massive mainframe computers, small computer systems provided relative space efficiency. In the intervening years, small computers have become increasingly more compact, powerful, and inexpensive. Whereas, in earlier decades, computers were so expensive that it was unusual for an individual to own and use more than a single small computer system, many professionals and even recreational computer users commonly own multiple systems, and often using desktop computers both at home and at work and carrying one or more small, mobile computers for use during travel, commuting, and while in meetings and/or classrooms. Computer peripherals have also decreased in price and size, while having greatly increased in power and functionality. It is common for computer users to, at any given point in time, use, and have need for access to, multiple computer systems and peripheral components, including printers, extra video-display devices, multiple keyboards, and other peripheral components. Even though individual computers and peripheral components have grown smaller, because users routinely own and concurrently use multiple computer systems and peripheral components at home and at work, the workspace area occupied by computer systems and peripheral components, referred to as the "footprint" of the computer systems and peripheral components, has become a relatively important consideration for purchasers and users. Designers, manufacturers, vendors, and users of computer systems and peripheral components therefore continue to seek lower-footprint computer systems and peripheral components in order to maximize those portions of workspace areas that are not occupied by computer systems and peripheral components.

SUMMARY OF THE INVENTION

Embodiments of the present invention include a switch component, incorporated within a computer system, that receives switch commands from users and that controls internal switches to direct output to, and receive input from, either components of the computer system or one or more external-access ports.

DETAILED DESCRIPTION OF THE INVENTION

There are many situations in which it may be desirable to share certain peripheral components among multiple computer systems. As one example, a user may have three or four different personal computers on a desktop for any of a variety of different reasons, including a need to have different hardware and operating-system platforms for running several applications, each developed exclusively for a different hardware and operating-system platform. Alternatively, a user may need to test or evaluate one or more target computer systems using a source computer system configured with testing and evaluation software, or may need to temporarily use multiple computer systems while transitioning from an older computer system to a new computer system. In such cases, it is often desirable to use a single keyboard, video-display device, and mouse for all of the computer systems, rather than use separate keyboards, mice, and video-display devices for each system. By using a common set of peripherals shared among multiple computer systems, one can achieve relatively large savings in workspace-area consumption, avoid inefficient movement about the workspace area needed to access different peripherals connected exclusively to single computer systems, and avoid purchasing redundant components.

Figure 1:
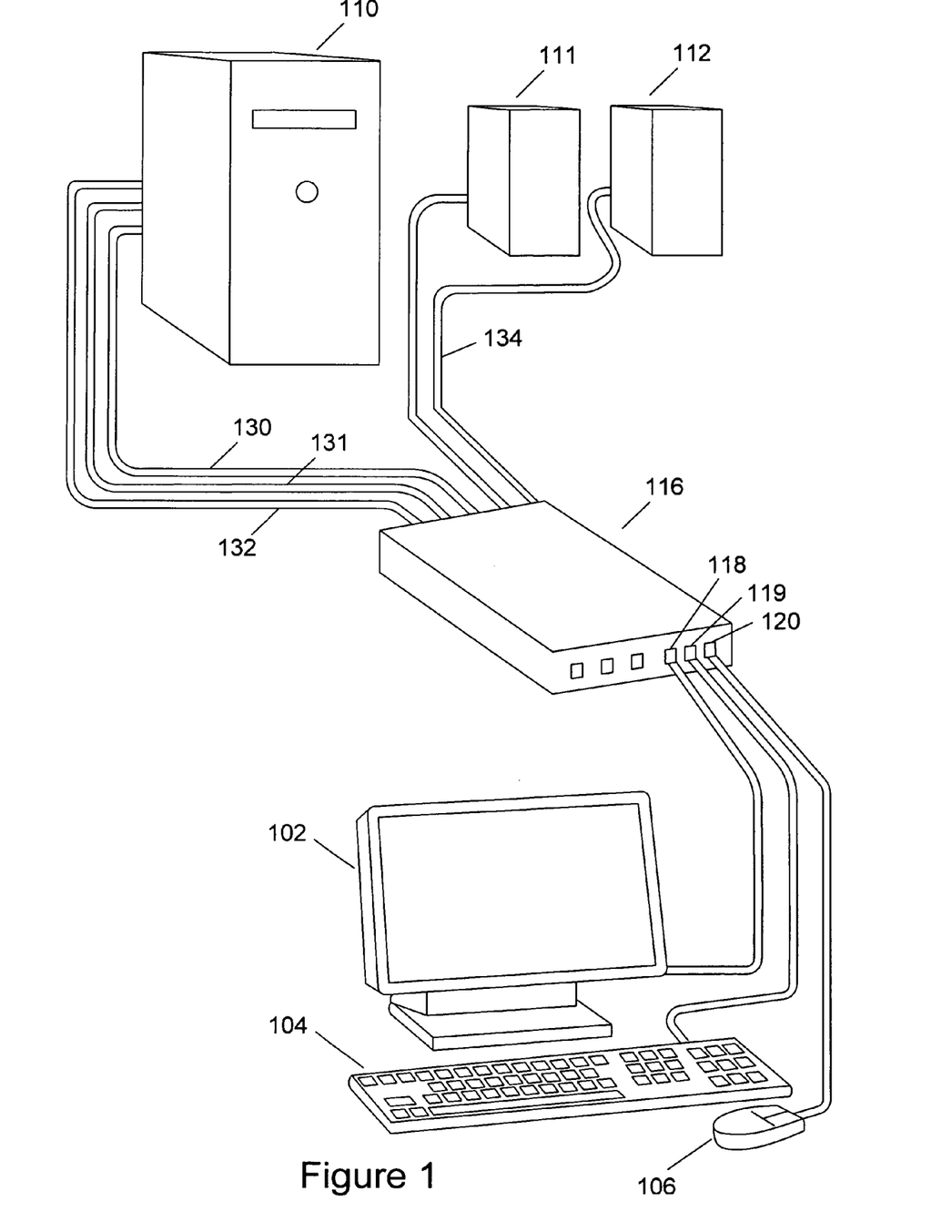
FIG. 1 illustrates one approach to sharing peripherals among computer systems.

FIG. 1 illustrates one approach to sharing peripheral components among computer systems. In FIG. 1, a video-display device 102, a keyboard 104, and a mouse 106 are interconnected with three different personal computers 110-112 through a keyboard-video-mouse ("KVM") switch 116. The video-display device, keyboard, and mouse are connected to ports 118-120, respectively, of the KVM switch, and the KVM switch is, in turn, connected to video, keyboard, and mouse ports on all three of the personal computers 110-112. Note that a computer may use three separate connectors, such as connectors 130-132 that interconnect personal computer 110 with the KVM switch 116 through three separate ports on the personal computer 110, or may be connected using single connectors, such as single connector 134 that interconnects personal computer 112 with the KVM switch 116, which bundle separate video, keyboard, and mouse connectors together and provide a single adapter that interconnects with a large multi-connection port on the personal computers that supports interconnection of multiple communications media, including, for example, serial links and cables that carry any of the various video-graphics-array ("VGA") analog signals (VGA, SVGA, XVGA, SXVGA, etc.). Moreover, a computer system may provide separate ports for the video-display device, keyboard, or mouse, or may provide, in addition, a single port for connecting all three peripherals using a bundled, single connector, such as the connector 134 that interconnects personal computer 112 with the KVM switch 116, and a multi-communications-media port.

There are many different types of KVM switches. A KVM switch may support connection of between two and many hundreds of computers with various numbers and types of peripheral components. In addition, certain types of KVM switches may support access, by one or more computer systems, to multiple instances of various peripheral components, including multiple video-display devices, keyboards, and mice. A mechanical KVM switch physically switches contacts in order to connect peripherals to one or more particular computer systems. Mechanical KVM switches have a drawback in that, in many cases, the operating system running on a computer system, particularly while booting, needs to make a logical connection with the various peripheral components in order to be properly configured. When a computer system is not physically connected to the peripherals by the mechanical KVM switch, the appropriate software components are not properly configured, so that, when a user subsequently switches the KVM to access the rebooted computer, the user cannot access the computer through the peripherals that were not connected to the computer through the KVM switch during the boot process. Electronic KVM switches use electronic routing of data and commands between selected peripheral components and selected computer systems, and provide emulation of certain of the peripheral components to those computer systems not currently selected for interconnection with physical peripheral components through the KVM switch. There are network-based KVM switches that use local area networks for interconnection of peripheral components and computer systems, rather than serial and parallel peripheral interconnects. Additional types of KVM switches use software switching and data routing. Various different types of KVM interfaces are provided to allow for user control of KVM operation. In many cases, a user can input a series of keystrokes or use a special KVM-interface switch to toggle connection between the peripheral devices and individual computer systems or groups of computer systems.

Figure 2A:
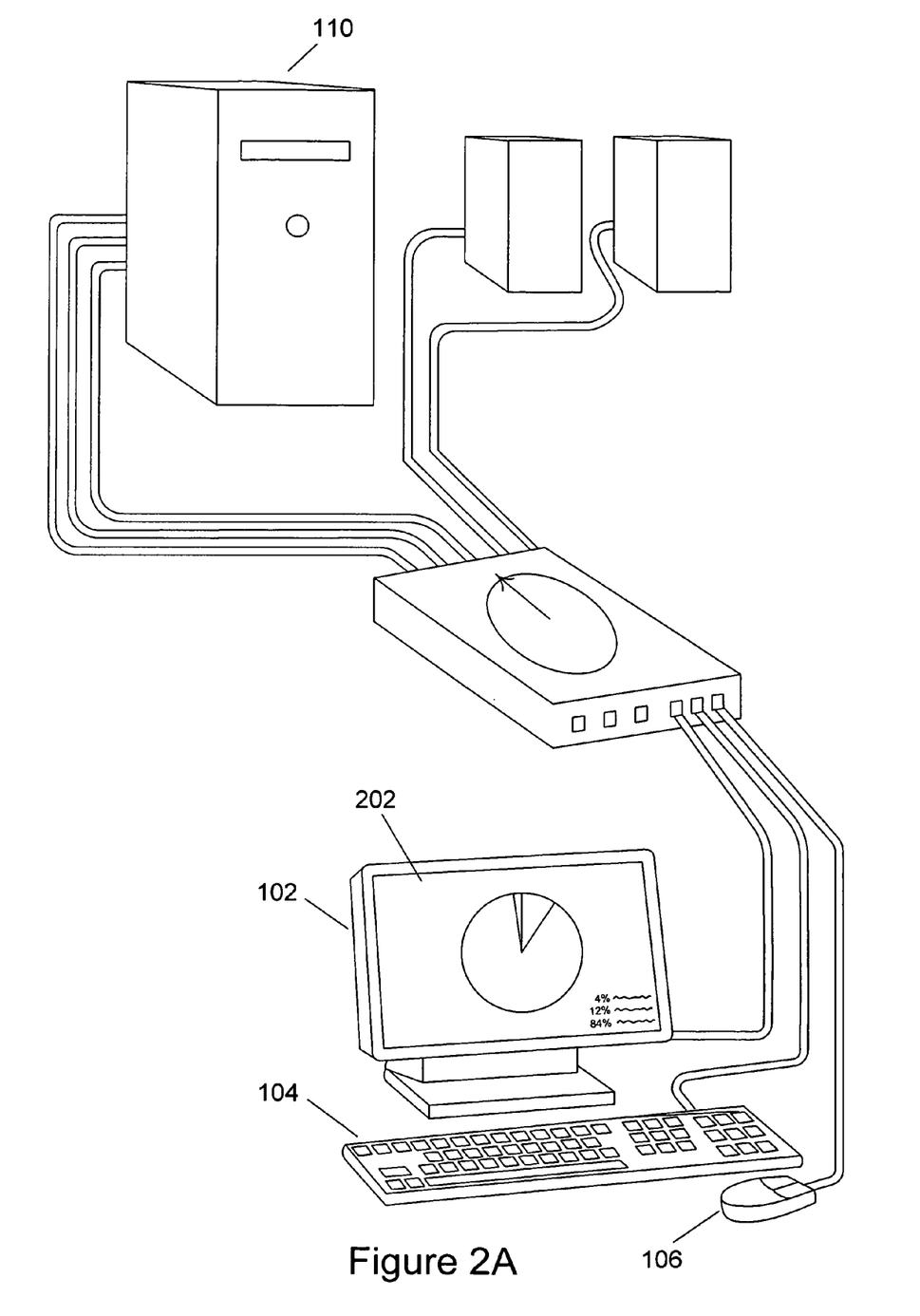
FIGS. 2A-C illustrate the function of the KVM switch shown in FIG. 1.
Figure 2B:
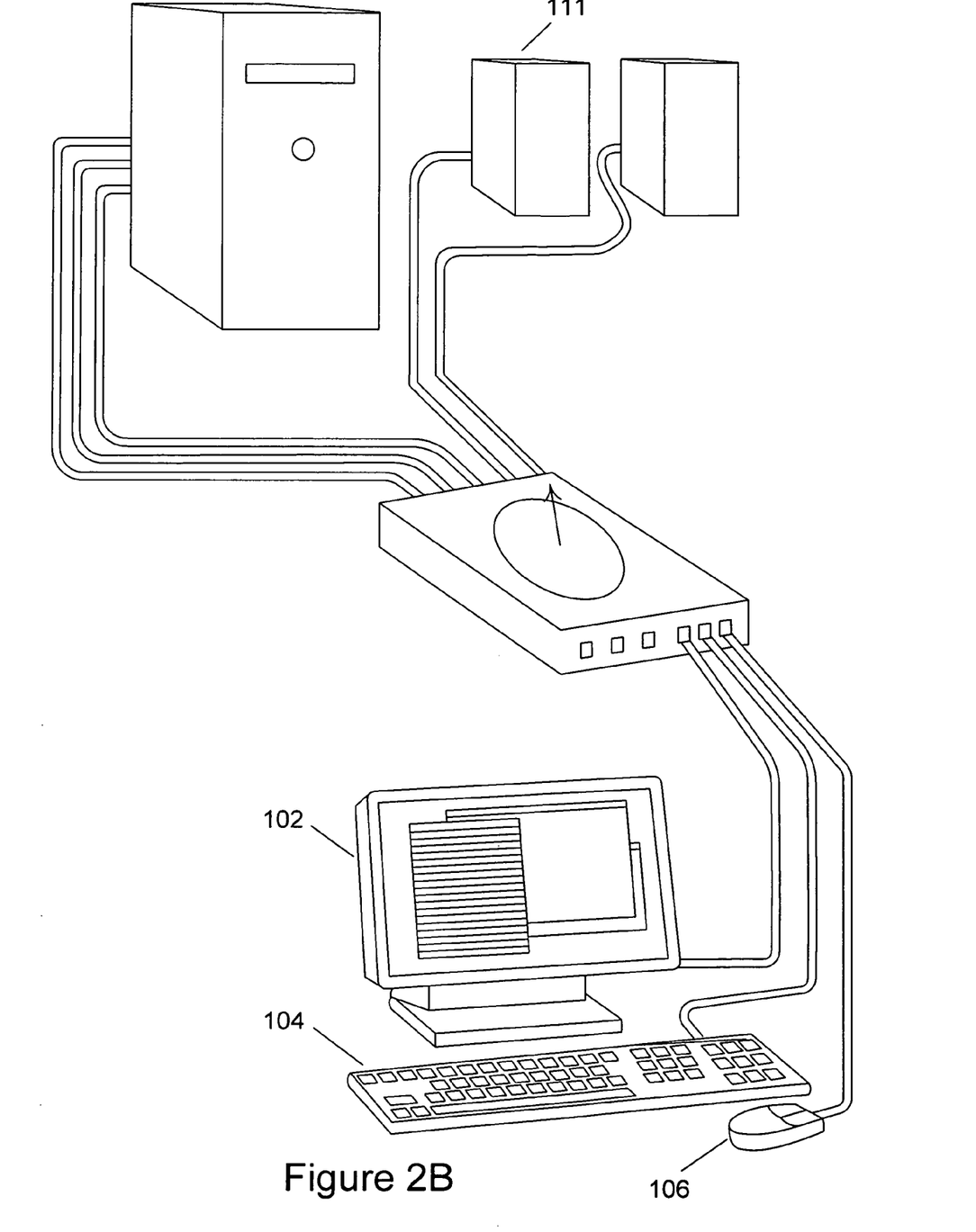
Figure 2C:
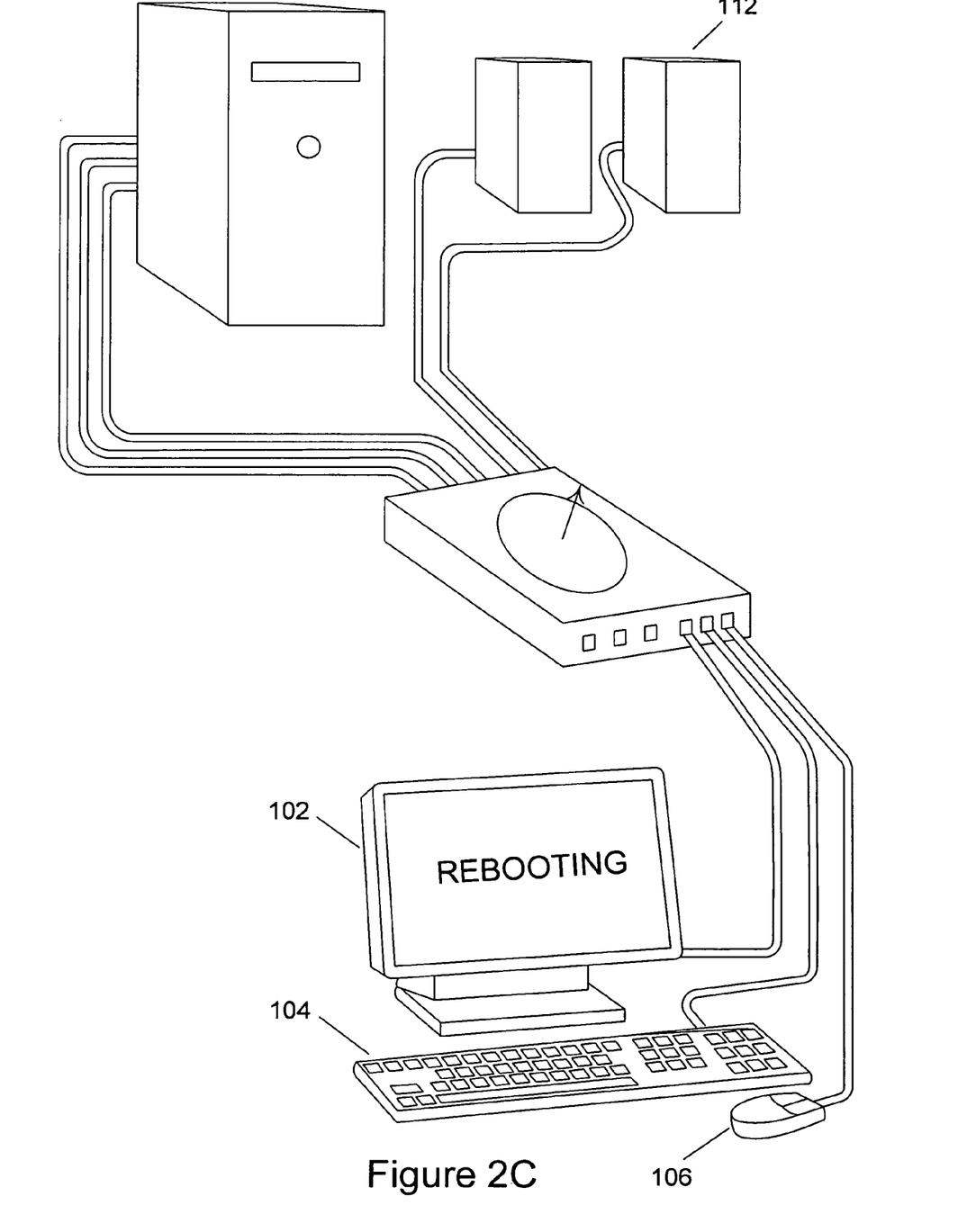

FIGS. 2A-C illustrate the function of the KVM switch shown in FIG. 1. In FIG. 2A, a user has selected interconnection of the video-display device 102, keyboard 104, and mouse 106 with personal computer 110. Personal computer 110 is currently displaying a visual business-application interface 202 to the user on the video-display device. Input of a switch sequence to the keyboard, or manipulation of a switch or control on the KVM-switch, allows the user to connect the video-display device 102, keyboard 104, and mouse 106 with personal computer 111, as shown in FIG. 2B, which is currently displaying an email application to the video-display device. As shown in FIG. 2C, the user can input a key sequence or manipulate a switch or control on the KVM-switch to connect the video-display device 102, keyboard 104, and mouse 106 to personal computer 112, which is currently rebooting.

As the price of small, mobile computer systems, such as laptops and notebooks, has decreased, and the performance of such systems has increased, more and more computer users exclusively purchase and use notebook and laptop computers, or purchase laptops and/or notebook computers in addition to desktop computers. Although, during the past ten years, the display devices and I/O devices included in mobile computers have markedly improved, it is still often the case that the larger and more capable video-display devices, keyboards, and mice typically included in desktop-computer systems are preferable to the equivalent peripherals included in mobile computers. For this reason, it is common for owners and users of mobile computers to additionally purchase a docking station and full-size video-display devices, keyboards, and mice for use with their mobile computers in the workplace and at home.

Figure 3:
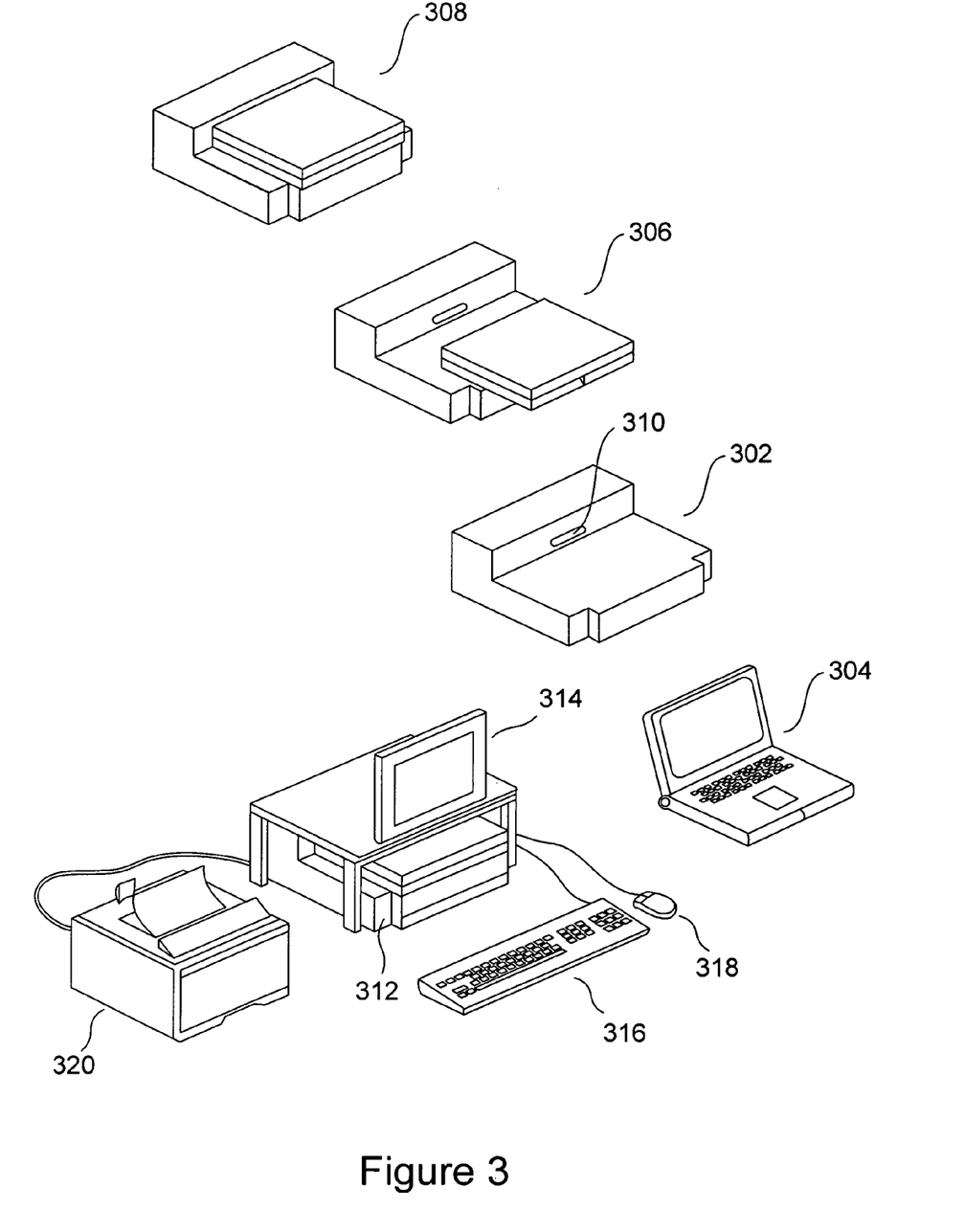
FIG. 3 illustrates use of a docking station.

FIG. 3 illustrates use of a docking station. The docking station 302 accommodates a notebook or laptop computer 304, providing a port-replicator functionality that allows the laptop computer 304 to be easily mounted 306 and 308 and electronically connected to the docking station. An expansion port at the back of the laptop mates with a complementary adapter 310 on the docking station to provide for connection of peripheral devices to the laptop computer through the docking station. The docking station 312 is then, in turn, electronically interconnected with various peripheral components, such as a full-size video-display device 314, a full-size keyboard 316, a mouse 318, and a printer 320. Once the laptop is mounted to the docking station, a user can interact with the laptop using the full-size video-display device 314, full-size keyboard 316, mouse 318, and other interactive devices just as the user would interact with a desktop computer. Thus, the docking station and additional peripheral components provide the equivalent of a desktop computer system in a workplace or home environment, allowing the user to easily connect a mobile computer to, and disconnect the mobile computer from, the docking station in order to employ the mobile computer outside of the home and workplace environments.

Figure 4:
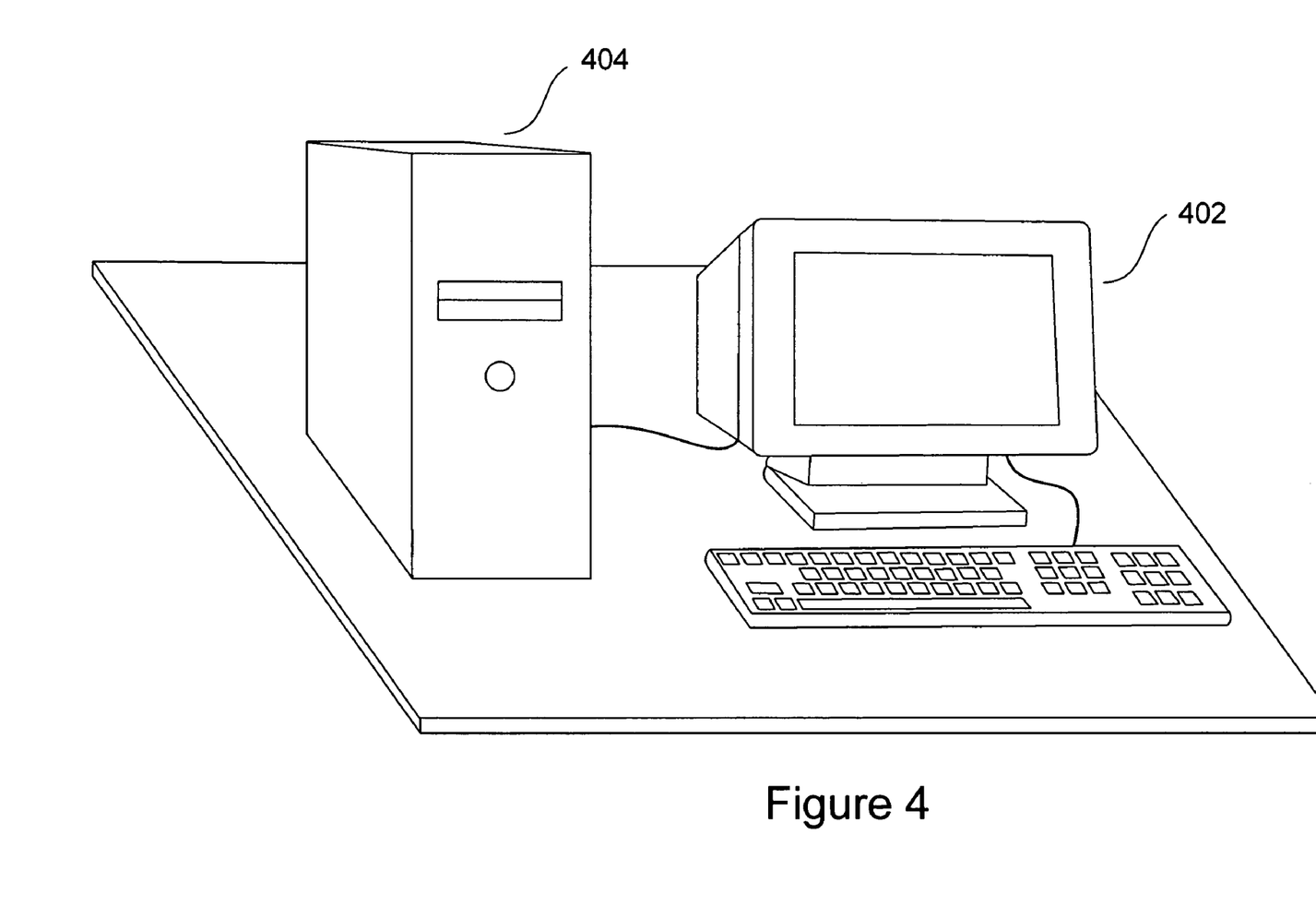
FIG. 4 shows an older-generation desktop-computer system arranged on a workplace surface.

As discussed above, the footprint of computer systems in home and workplace environments is an increasingly important consideration for purchase of computer systems and an important constraint on the use and utility of computer systems. FIG. 4 shows an older-generation desktop-computer system arranged on a workplace surface. The older-generation computer systems often featured a cathode-ray-tube ("CRT") display monitor 402 and bulky enclosures 404 with large footprints. Even without considering the additional workspace area consumed by printers and other types of peripheral devices, these older-generation systems generally easily consumed the bulk of available space on workspace surfaces.

With the advent of inexpensive LCD monitors, the footprint of computer systems has been significantly decreased. A decrease in the footprint of computer systems has also been facilitated by significant decreases in the sizes of various other peripheral devices, including printers and device enclosures.

Figure 5:
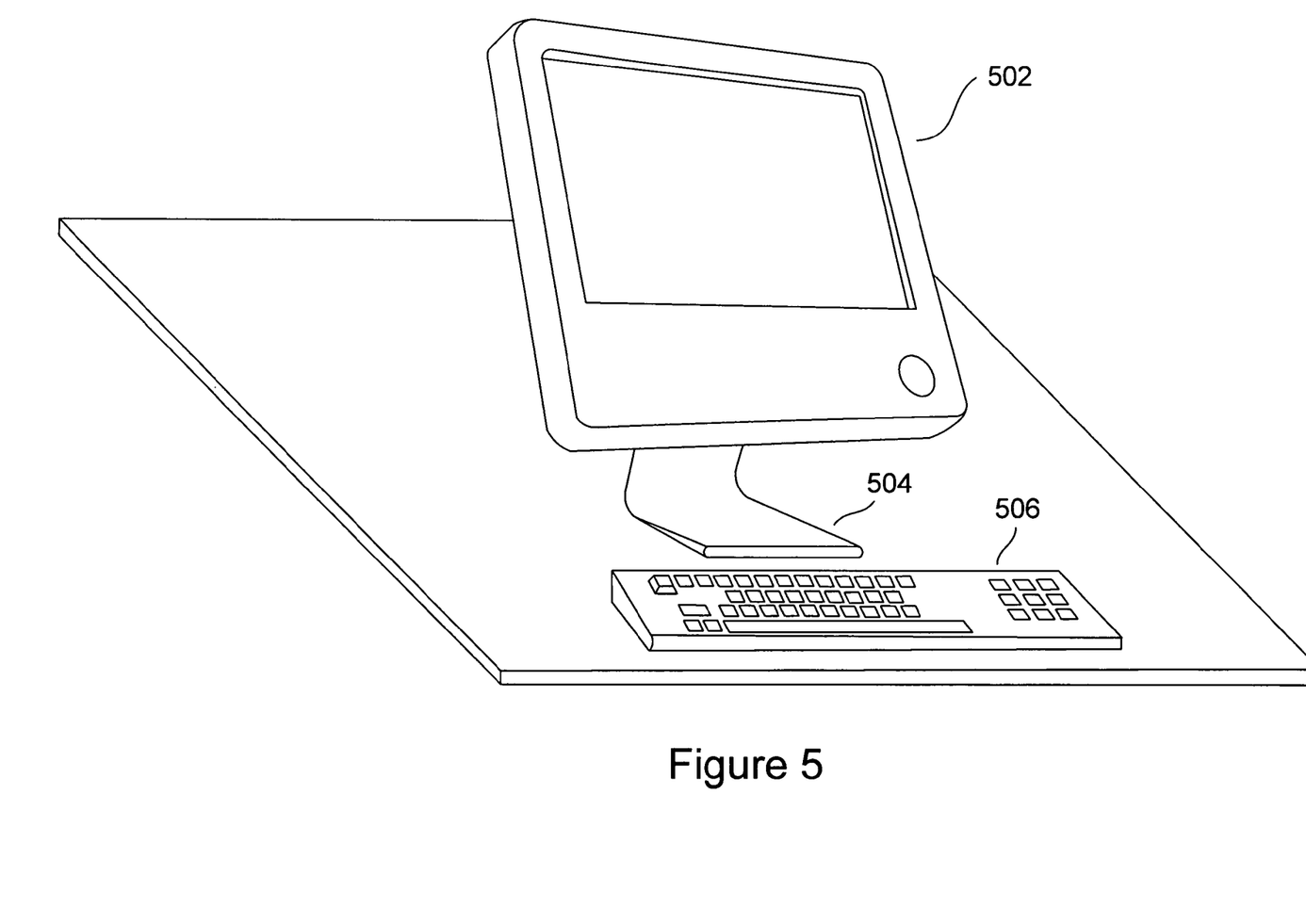
FIG. 5 illustrates an AIO computer.

A relatively new advancement in space-efficient computer systems is the various types of all-in-one ("AIO") computer systems in which the video-display device, processor, memory, mass-storage devices, power supply, and other internal computer-system components are included in one relatively low-volume unit with an exceedingly small workspace footprint. FIG. 5 illustrates an AIO computer. The AIO computer 502 features a single, integrated enclosure that includes the video-display device and the other, internal components that were formerly enclosed in a separate device enclosure. The AIO computer is mounted to a stand 504, the bottom surface of which represents the entire footprint of the AIO computer system. A separate keyboard 506, mouse (not shown in FIG. 5), speakers (not shown in FIG. 5), and other such peripheral components can be connected to the AIO computer using various ports and connection interfaces.

As discussed above, it is common for computer owners and users to own both stationary computer systems, like the AIO computer system illustrated in FIG. 5, in both home and workplace environments as well as one or more mobile computers, such as a laptop computer. As discussed above, the keyboard, mouse, loudspeakers, and video-display device included in or attached to full-size computer systems are generally preferable to those included in laptop computers. Therefore, as discussed with reference to FIG. 3, the owner of an AIO computer system often prefers to employ a docking station for a laptop computer in order to interface with the laptop computer, at home or in the workplace, using full-size computer peripherals. However, as discussed with reference to FIG. 5, an AIO computer system incorporates the video-display device within the single unit of the AIO computer system that includes the processor, memory, mass-storage devices, and other internal components. The computer user may purchase a docking station and full-size video-display device for the laptop computer, but a full-size video-display device purchased for connection the docking station often represents a redundant purchase, since the stationary AIO computer system includes a full-size video-display device. Currently, there is no easy and readily available method for the owner of an AIO computer system and a laptop system to share the video-display device of an AIO computer system between both a laptop and the AIO computer system, as can be done with a KVM switch and docking station in the case of older-generation desktop computers and laptop systems.

Figure 6:
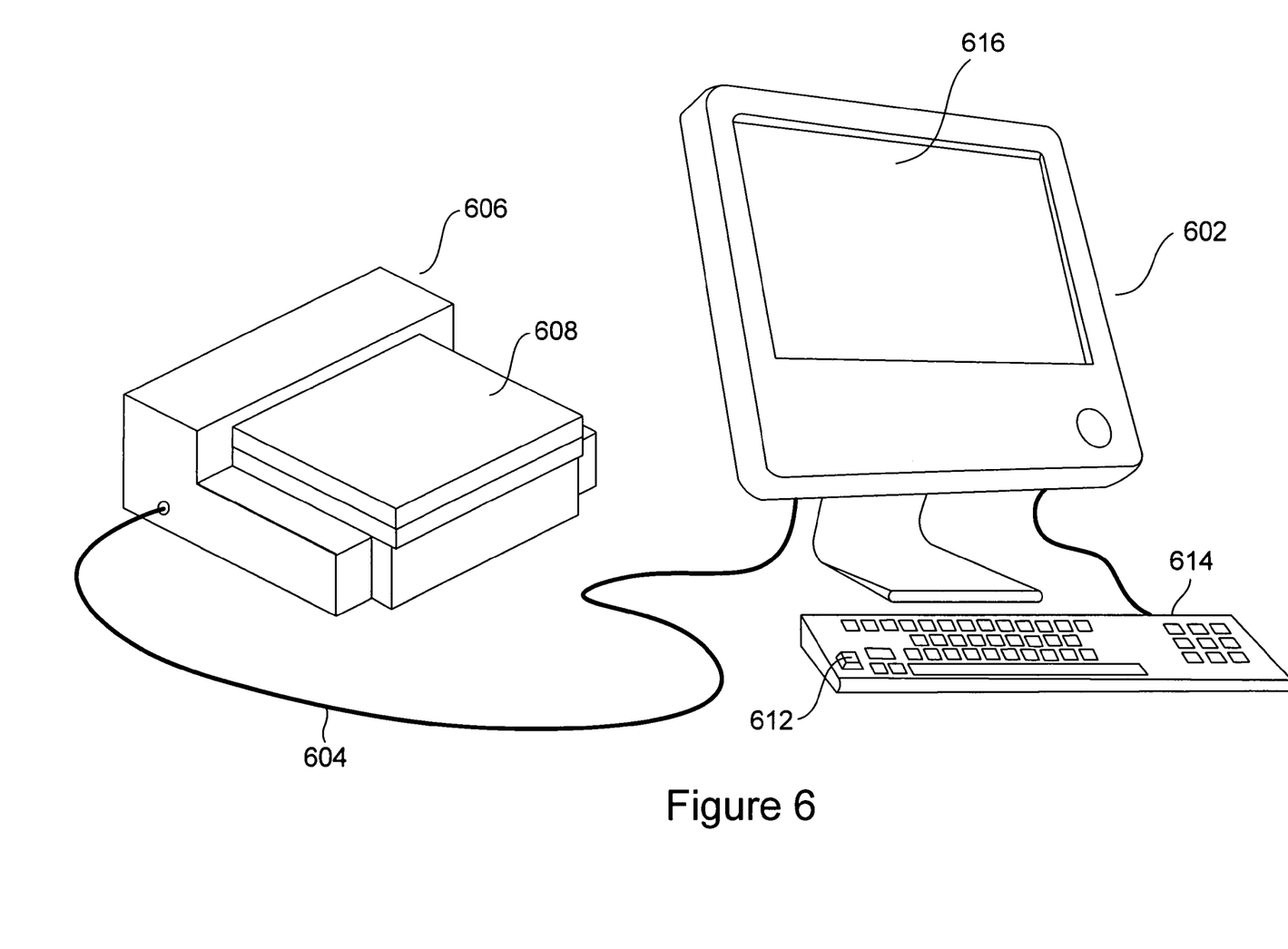
FIG. 6 illustrates one embodiment of the present invention.

Embodiments of the present invention are directed to computer systems that provide internal KVM-switch-like functionality, so that the internal components of a first computer system that features the internal KVM-switch-like functionality can be shared with external computer systems. FIG. 6 illustrates one embodiment of the present invention. In FIG. 6, an AIO computer system 602 with internal KVM-switch-like functionality provides a multi-connection port (not shown in FIG. 6) to which an electronic connector 604 is mated in order to electronically connect the AIO computer 602 with a docking station 606. When an operating laptop 608 is mounted to the docking station, a user can select certain of the external and internal peripherals of the AIO computer system to be connected, via the internal KVM-switch-like functionality, to the docking station and laptop computer. Thus, by toggling a special KVM-switch key 612 on a keyboard 614 directly connected to the AIO computer system 602, in one embodiment of the present invention, a user can select for keyboard input either to the AIO computer system 602 or to the laptop 608. Similarly, output data from the laptop 608 can be displayed on the video-display device 616 of the AIO computer system 602 or, alternatively, a user can select for display of data output by the AIO computer system 602 to the video-display device 616 of the AIO computer system. Although one embodiment features a special KVM-switch key 612 on the AIO-computer-system keyboard 614, the internal KVM-switch-like functionality that represents one embodiment of the present invention may be accessed by a user using special function keys, various key-stroke sequences, various KVM-switch-like control interfaces incorporated into the single unit of the AIO computer system, or even a graphical-user interface displayed to the video-display device of the AIO computer system.

Figure 7:
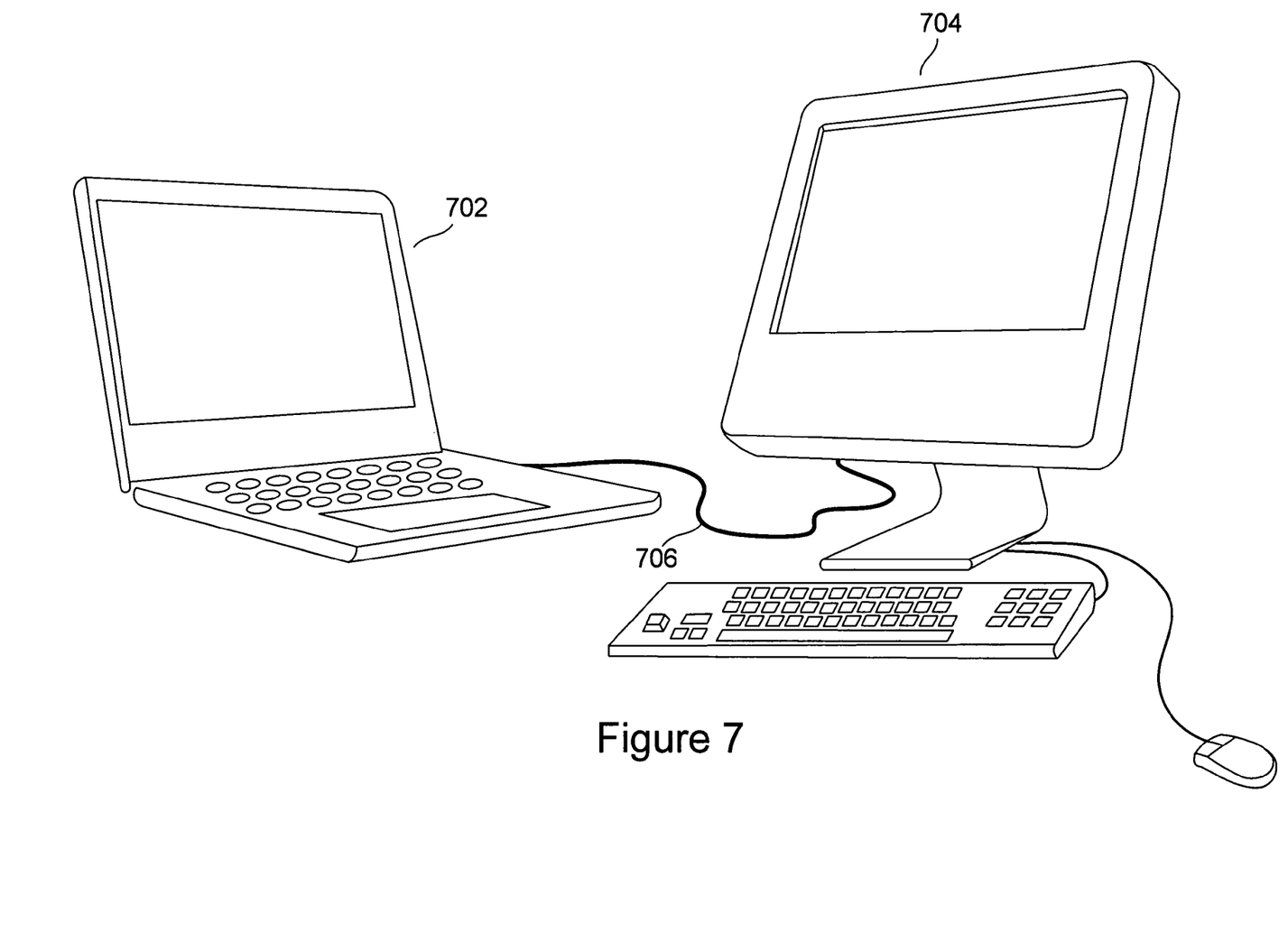
FIG. 7 illustrates a second embodiment of the present invention.

FIG. 7 illustrates a second embodiment of the present invention. In this second embodiment, a laptop 702 can be directly connected to an AIO computer system 704 via a port on the laptop computer (not shown in FIG. 7), an electronic connector 706, and a port on the AIO computer system (not shown in FIG. 7). In this embodiment, no docking station is needed. In the second embodiment, shown in FIG. 7, like in the first embodiment shown in FIG. 6, the AIO computer system includes KVM-switch-like functionality allowing a user to selectively interconnect various internal and external peripherals of the AIO computer system to the laptop computer.

Various different internal components that provide KVM-switch-like functionality according to embodiments of the present invention may allow for selective connection of the internal components of, and external peripherals attached to, a first computer to one or more external computers. The internal and external components that may be shared between computer systems using the internal KVM-switch-like functionality that represents an embodiment of the present invention may include keyboards, mice, video-display devices, loudspeakers, peripheral mass-storage devices, and, when properly configured and provided with dual or switchable ports, even internal mass-storage devices and other internal components of the computer system that includes the internal KVM-switch-like functionality. The internal components and attached peripherals may be shared individually, as groups, or as a single group. In certain embodiments, a computer system equipped with internal KVM-switch-like functionality according to an embodiment of the present invention may additionally include a software-implemented graphical user interface to allow for user control of the internal KVM-switch-like functionality. In the computing environment shown in FIG. 7, both the AIO computer system 704 and the laptop 702 may include embodiments of the internal KVM-switch-like functionality, in which case a user may be able to display output from the AIO computer system on the video-display device of the laptop, in addition to displaying output from the laptop on the video-display device of the AIO computer system.

Figure 8A:
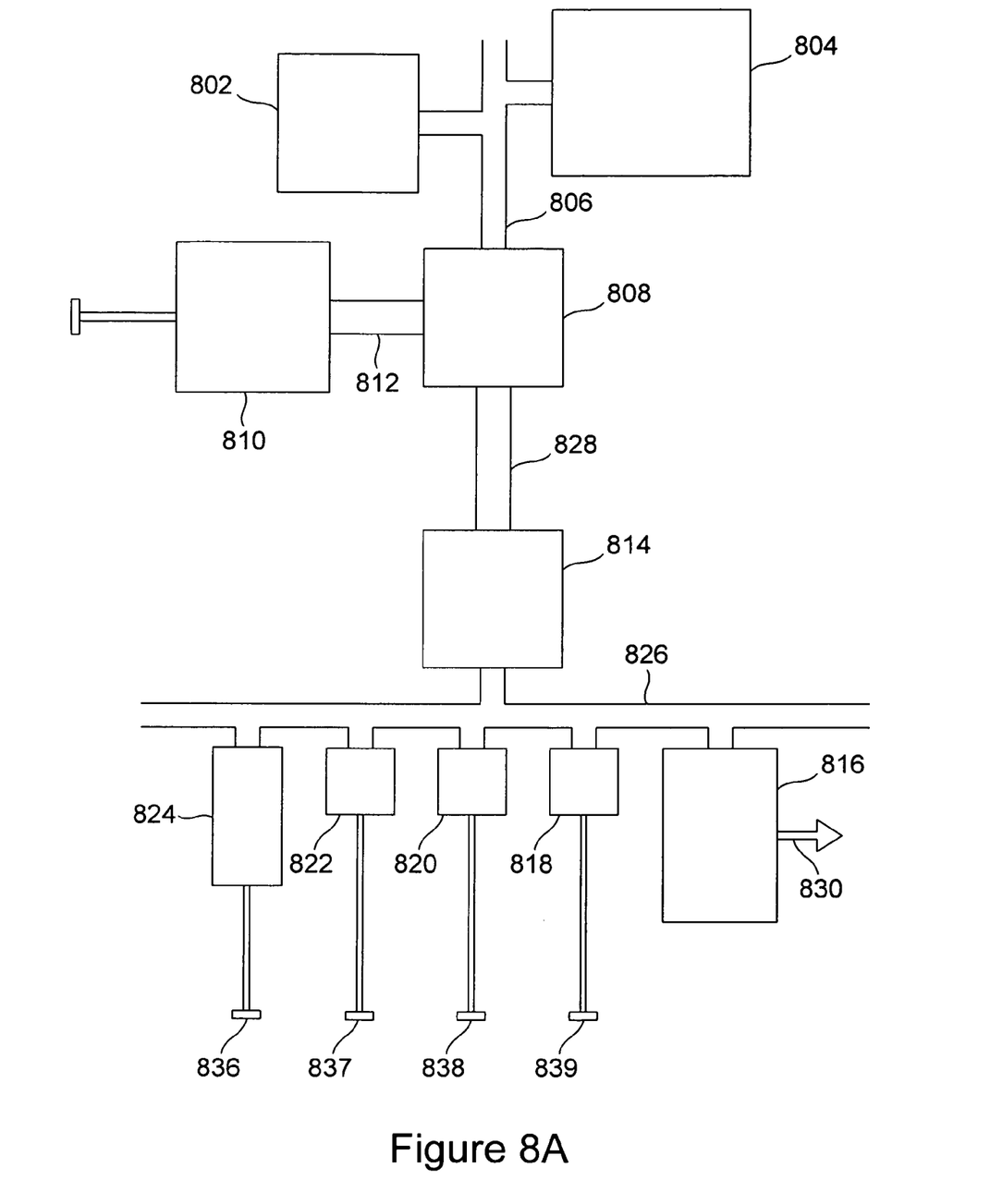
FIGS. 8A-B illustrate implementation of one embodiment of the present invention.
Figure 8B:
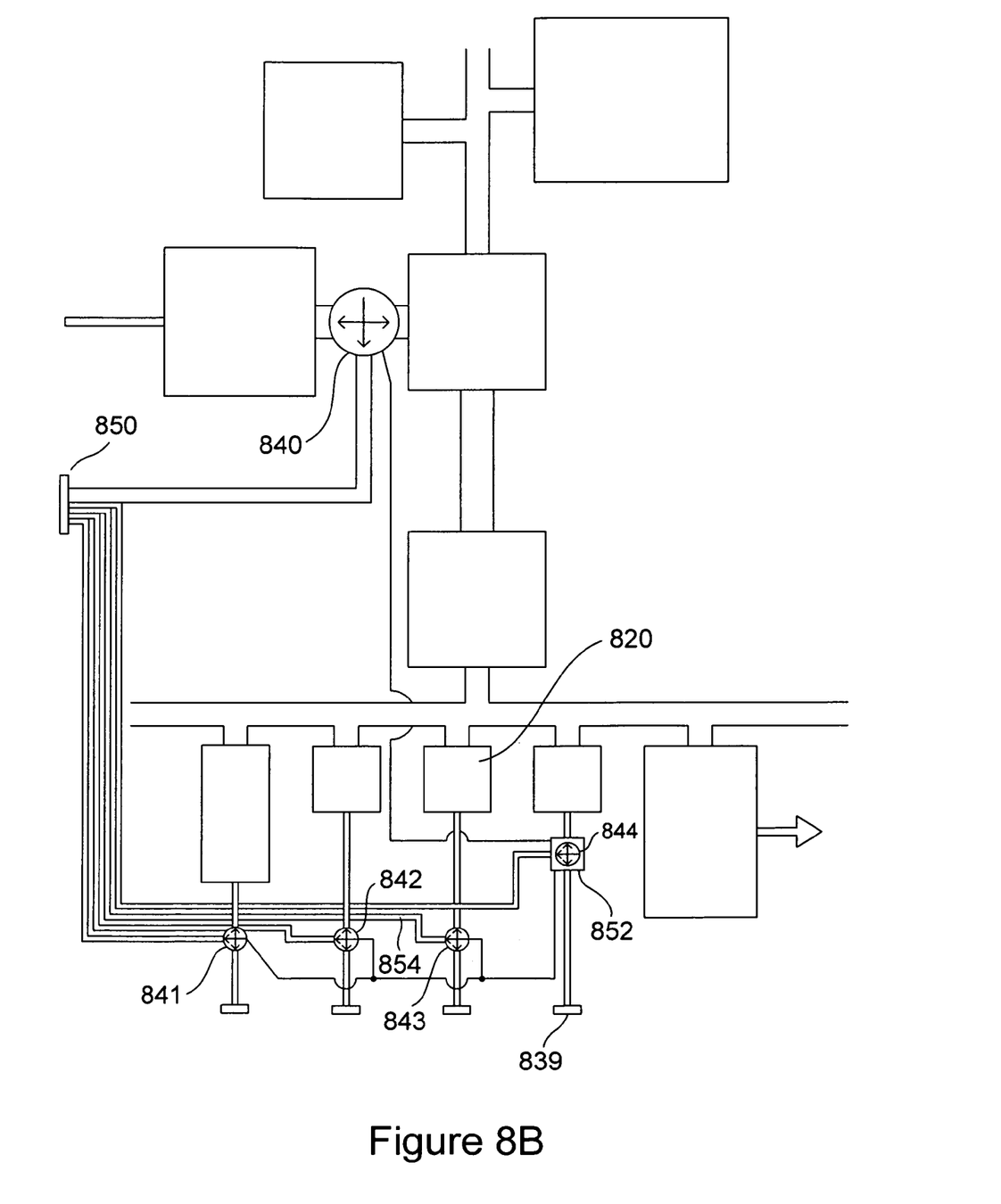

FIGS. 8A-B illustrate implementation of one embodiment of the present invention. FIG. 8A shows a simplified diagram of internal components of a computer system. The computer system includes a processor 802, a memory 804, a CPU bus 806 that interconnects the processor, memory, and a bus bridge 808. The bus bridge is connected with a video-display controller 810 via a high-bandwidth communications medium 812. The bridge 808 is interconnected with a second bridge 814, in turn connected to various peripheral-device controllers, including a mass-storage-device controller 816, a keyboard controller 818, a mouse controller 820, an audio-output device 822, and a communications controller 824. In general, the communications media, including communications media 812, 826, 828, and 830 may be implemented using either high-speed bus technologies or higher-speed low-voltage differential-signaling ("LVDS") communications media, including PCIe and SAS. Certain of the peripheral controllers are interconnected to ports 836-839 via lower-bandwidth serial connections.

FIG. 8B shows the internal components of a computer system, shown in FIG. 8A, that has been modified according to an embodiment of the present invention to provide the internal KVM-switch-like functionality that represents one embodiment of the present invention. A number of electronic switches 840-844 have been added to the system so that input to, and output from, various internal and external peripherals can be redirected to an external-access port 850 to which an electronic connector, such connector 706 in FIG. 7, can be connected to interconnect one or more external computers and/or docking stations with the external-access port. A special KVM component 852 includes the electronic switch 844 that controls where keyboard input received through port 839 is directed. The KVM component 852 intercepts keyboard input to detect either depression of a special KVM-switch key or any of the key sequences that invoke the internal KVM-switch functionality. The KVM component 852 is electronically connected to the internal switches 840-843 in order to control direction of data and signals within the computer system to and from the external-access port or to and from internal components of the computer system. For example, when the KVM-switch-like functionality is invoked to direct mouse input to a laptop computer connected to the computer system through the external-access port, the KVM component 852 sends a signal to switch 843 to direct mouse input along communications medium 854 to the external-access port 850, rather than to the mouse controller 820. The user may subsequently depress a switch key to control the internal KVM-switch-like functionality to redirect mouse input to the computer system that includes the internal KVM-switch-like functionality. An input symbol corresponding to the key is intercepted by the KVM component 852, which sends a signal to switch 843 to subsequently direct mouse input to mouse controller 820. As discussed above, in certain embodiments, the internal-KVM-switch-like functionality may be separately invoked to control input from, and output to, each of the various internal and external peripheral components that may be shared via the internal KVM-switch-like functionality. In other embodiments, all of the internal components and internal and external peripherals are switched, together, by the internal KVM-switch-like functionality.

Although the present invention has been described in terms of particular embodiments, it is not intended that the invention be limited to these embodiments. Modifications will be apparent to those skilled in the art. For example, any of a variety of different types of electronic connectors, ports, and other interfaces may be used to interconnect a first computer system that includes internal KVM-switch-like functionality that represents one embodiment of the present invention to external computers. Any of a variety of different user interfaces to the internal KVM-switch-like functionality may be implemented, including a special KVM-switch key on a keyboard, special key sequences, mapping of function keys to KVM-switch-like-functionality interfaces, or more elaborate graphical user interfaces for the KVM-switch-like functionality. In the latter case, the internal switches discussed with reference to FIG. 8B may be directly controlled by the processor, or a control interface to the KVM device (852 in FIG. 8B) may be provided to the processor and operating-system routines running on the processor. The internal-KVM-switch-like functionality that represents various embodiments of the present invention may be used to provide, to external computers, access to any number of different internal components of, or external peripheral devices connected to, a computer system. In certain embodiments, the internal KVM-switch-like functionality may be incorporated within more complex functionalities that, for example, may allow a video-display device to be split, and output from two or more computers directed to particular portions of the video-display device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computer system comprising:
    a processor;
    memory electronically connected to the processor by a first communications medium;
    a bridge connected with the processor and memory by the first communications medium and interconnected with controllers that provide electronic interfaces to input/output devices, mass storage devices, display monitors, and other computer-system components; and
    a switch component that receives switch commands from users and that controls internal switches to direct output to, and receive input from:
        internal components of the computer system,
        external peripherals attached to the computer system, and
        one or more external-access ports;
    wherein the switch component is configured to emulate one or more of the external peripherals to another computer system.

2. The computer system of claim 1
    wherein the computer system includes a keyboard controller connected to a keyboard;
    wherein, when a user inputs a first command to the switch component, keyboard input is directed to the keyboard controller; and
    wherein, when the user inputs a second command to the switch component, keyboard input is directed to one of the one or more external-access ports.

3. The computer system of claim 1
    wherein the computer system includes a display-monitor controller connected to a display monitor;
    wherein, when a user inputs a first command to the switch component, display-monitor-data are directed from the bridge to the display-monitor controller; and
    wherein, when the user inputs a second command to the switch component, display-monitor-data are directed from one of the one or more external-access ports to the display-monitor controller.

4. The computer system of claim 1
    wherein the computer system includes a mouse controller connected to a mouse;
    wherein, when a user inputs a first command to the switch component, mouse input is directed to the mouse controller; and
    wherein, when the user inputs a second command to the switch component, mouse input is directed to one of the one or more external-access ports.

5. The computer system of claim 1
    wherein the computer system includes one of
        an audio card connected to loudspeakers,
        a network controller connected to a network connection, and
        an I/O port connected to a printer;
    wherein, when a user inputs a first command to the switch component,
        audio-card output is directed to the loudspeakers,
        network-controller output is directed to the network connection, or
        I/O data is directed to the printer; and
    wherein, when the user inputs a second command to the switch component,
        audio-card output is directed to one of the one or more external-access ports,
        network-controller output is directed to the one or more external-access ports, or
        I/O data is directed to the one or more external-access ports.

6. The computer system of claim 1 wherein the switch component receives switch commands from the processor or another internal component of the computer system and wherein the switch component is electronically connected to one or more internal switches controlled by the switch component.

7. The computer system of claim 1 wherein the switch component receives user commands from a user input device and wherein the switch component is electronically connected to one or more internal switches controlled by the switch component.

8. The computer system of claim 7 wherein the switch component monitors input from a keyboard and wherein the switch component detects a user command by detecting depression, by a user, of a switch key as a key symbol in the keyboard input.

9. The computer system of claim 7 wherein the switch component monitors input from a keyboard and wherein the switch component detects a user command by detecting a switch keystroke sequence in the keyboard input.

10. An external-access switching component of a computer system comprising:
   a switch-command-detecting subcomponent;
   a first switch, controlled by the switch-command-detecting subcomponent, that directs input received from a peripheral component of the computer system to an internal component of the computer system, in a first switch mode, and directs input from the peripheral component of the computer system to an external-access port, in a second mode; and
   a second switch controlled by the switch-command-detecting subcomponent that directs output from an internal component of the computer system to a peripheral component of the computer system, in a first switch mode, and directs output from an external-access port to a peripheral component of the computer system, in a second mode;
   wherein the external-access switching component is configured to emulate one or more of the external peripherals to another computer system.

11. The external-access switching component of claim 10 wherein the switch-command-detecting subcomponent receives switch commands from the processor or another internal component of the computer system and wherein the switch-command-detecting subcomponent is electronically connected to first and second switches.

12. The external-access switching component of claim 10 wherein the switch-command-detecting subcomponent receives user commands from a user input device and wherein the switch-command-detecting subcomponent is electronically connected to first and second switches.

13. The external-access switching component of claim 12 wherein the switch-command-detecting subcomponent monitors input from a keyboard and wherein the switch-command-detecting subcomponent detects a user command by detecting depression, by a user, of a switch key as a key symbol in the keyboard input.

14. The external-access switching component of claim 12 wherein the switch-command-detecting subcomponent monitors input from a keyboard and wherein the switch-command-detecting subcomponent detects a user command by detecting a switch keystroke sequence in the keyboard input.

15. The external-access switching component of claim 12 wherein the switch-command-detecting subcomponent monitors input from a pushbutton and wherein the switch-command-detecting subcomponent detects a user command by detecting an electrical signal generated by depression, by a user, of the pushbutton.

16. An all-in-one computing system comprising:
   a single housing comprising:
      a processor;
      a memory electronically connected to the processor by a first communications medium;
      a display monitor;
      a bridge connected with the processor and memory by the first communications medium and interconnected with controllers that provide electronic interfaces to input/output devices, mass storage devices, display monitors, and other computer-system components; and
      a switch component that receives switch commands from users and that controls internal switches to direct output to, and receive input from:
         internal components of the all-in-one computing system,
         external peripherals attached to the all-in-one computing system, and
         one or more external-access ports;
      wherein said one or more external-access ports are configured to facilitate a connection between the all-in-one computing system and a computing system positioned apart from the all-in-one computing system; and
      wherein the switch component is configured to emulate one or more of the external peripherals to another computer system.

17. The all-in-one computing system of claim 16 further comprising a keyboard controller connected to a keyboard;
   wherein, when a user inputs a first command to the switch component, keyboard input is directed to the keyboard controller; and
   wherein, when the user inputs a second command to the switch component, keyboard input is directed to one of the one or more external-access ports.

18. The all-in-one computing system of claim 16 further comprising a display-monitor controller connected to the display monitor;
   wherein, when a user inputs a first command to the switch component, display-monitor-data are directed from the bridge to the display-monitor controller; and
   wherein, when the user inputs a second command to the switch component, display-monitor-data are directed from one of the one or more external-access ports to the display-monitor controller.

19. The all-in-one computing system of claim 16 further comprising a mouse controller connected to a mouse;
   wherein, when a user inputs a first command to the switch component, mouse input is directed to the mouse controller; and
   wherein, when the user inputs a second command to the switch component, mouse input is directed to one of the one or more external-access ports.

20. The all-in-one computing system of claim 16 further comprising at least one selected from the group comprising: an audio card connected to loudspeakers, a network controller connected to a network connection, and an I/O port connected to a printer;
   wherein, when a user inputs a first command to the switch component, audio-card output is directed to the loudspeakers, network-controller output is directed to the network connection, or I/O data is directed to the printer; and
   wherein, when the user inputs a second command to the switch component, audio-card output is directed to one of the one or more external-access ports, network-controller output is directed to the one or more external-access ports, or I/O data is directed to the one or more external-access ports.

* * * * *